United States Patent
Yanagida

(10) Patent No.: US 7,664,476 B2
(45) Date of Patent: Feb. 16, 2010

(54) HUMAN BODY COMMUNICATION SYSTEM AND COMMUNICATION DEVICE

(75) Inventor: Toshiharu Yanagida, Tokyo (JP)

(73) Assignee: Sony Corporation, Tokyo (JP)

( * ) Notice: Subject to any disclaimer, the term of this patent is extended or adjusted under 35 U.S.C. 154(b) by 861 days.

(21) Appl. No.: 11/385,727

(22) Filed: Mar. 22, 2006

(65) Prior Publication Data

US 2006/0252371 A1 Nov. 9, 2006

(30) Foreign Application Priority Data

Apr. 18, 2005 (JP) .............................. 2005-120317

(51) Int. Cl.
*H04B 1/18* (2006.01)
(52) U.S. Cl. .............. 455/188.1; 455/176.1; 455/168.1; 455/127.1; 340/539.1; 340/522; 375/573.1
(58) Field of Classification Search ............. 455/188.1, 455/176.1, 168.1, 127.1, 410, 15, 17; 340/539.1, 340/522, 561; 375/573.1
See application file for complete search history.

(56) References Cited

U.S. PATENT DOCUMENTS

| 5,914,701 | A | 6/1999 | Gersheneld et al. | |
| 6,211,799 | B1 * | 4/2001 | Post et al. ...................... | 341/33 |
| 6,754,472 | B1 | 6/2004 | Williams et al. | |
| 7,088,267 | B2 | 8/2006 | Tajima | |
| 7,312,788 | B2 * | 12/2007 | Fleischmann et al. ....... | 345/157 |
| 7,443,290 | B2 * | 10/2008 | Takiguchi ................ | 340/539.1 |
| 2006/0077616 | A1 * | 4/2006 | Takiguchi ................... | 361/231 |
| 2006/0158820 | A1 * | 7/2006 | Takiguchi ................... | 361/231 |
| 2006/0178109 | A1 * | 8/2006 | Takiguchi ................... | 455/41.1 |
| 2006/0200467 | A1 * | 9/2006 | Ohmori et al. ................. | 707/9 |
| 2007/0040545 | A1 * | 2/2007 | Takiguchi ................ | 324/76.11 |
| 2007/0055123 | A1 * | 3/2007 | Takiguchi ................... | 600/407 |
| 2007/0154878 | A1 * | 7/2007 | Takiguchi ...................... | 435/4 |
| 2009/0124201 | A1 * | 5/2009 | Meskens .................... | 455/41.2 |

FOREIGN PATENT DOCUMENTS

| EP | 1 100 218 A2 | 5/2001 |
| JP | 6-47012 | 2/1994 |

(Continued)

OTHER PUBLICATIONS

"Human body communication already partly put to practical use, 10-Mbits/second Prototype" (Nikkei Byte Dec. 2004), 5 pages.

*Primary Examiner*—Minh D Dao
(74) *Attorney, Agent, or Firm*—Oblon, Spivak, McClelland, Maier & Neustadt, L.L.P.

(57) ABSTRACT

Disclosed herein is a human body communication system for communicating data via an electric field formed by intervention of a human body, the human body communication system including: a transmitter for generating the electric field by transmitting a potential difference signal corresponding to transmission data from a transmitting electrode; and a receiver for receiving the data by reading the potential difference signal in the electric field by a receiving electrode; wherein the transmitter and the receiver use the potential difference signal in a frequency band such that a quasi-electrostatic field formed within the human body is dominant over a radiation field formed outside the human body when the transmitting electrode and the receiving electrode are each disposed in very close vicinity to the human body.

15 Claims, 10 Drawing Sheets

FOREIGN PATENT DOCUMENTS

| | | |
|---|---|---|
| JP | 7-170215 | 7/1995 |
| JP | 2001-144662 | 5/2001 |
| JP | 2001-160801 | 6/2001 |
| JP | 2001-298425 | 10/2001 |
| JP | 2002-261702 | 9/2002 |
| JP | 2004-261243 | 9/2004 |
| JP | 2004-266388 | 9/2004 |
| JP | 2004-282733 | 10/2004 |

* cited by examiner

Vin : −30dBm   ELECTRODE : 30 x 30mm
Vosc : −10dBm   TRANSMISSION DISTANCE : 30mm
IF : 10.7MHz
fm : 1kHz
Mod : ±22.5kHz

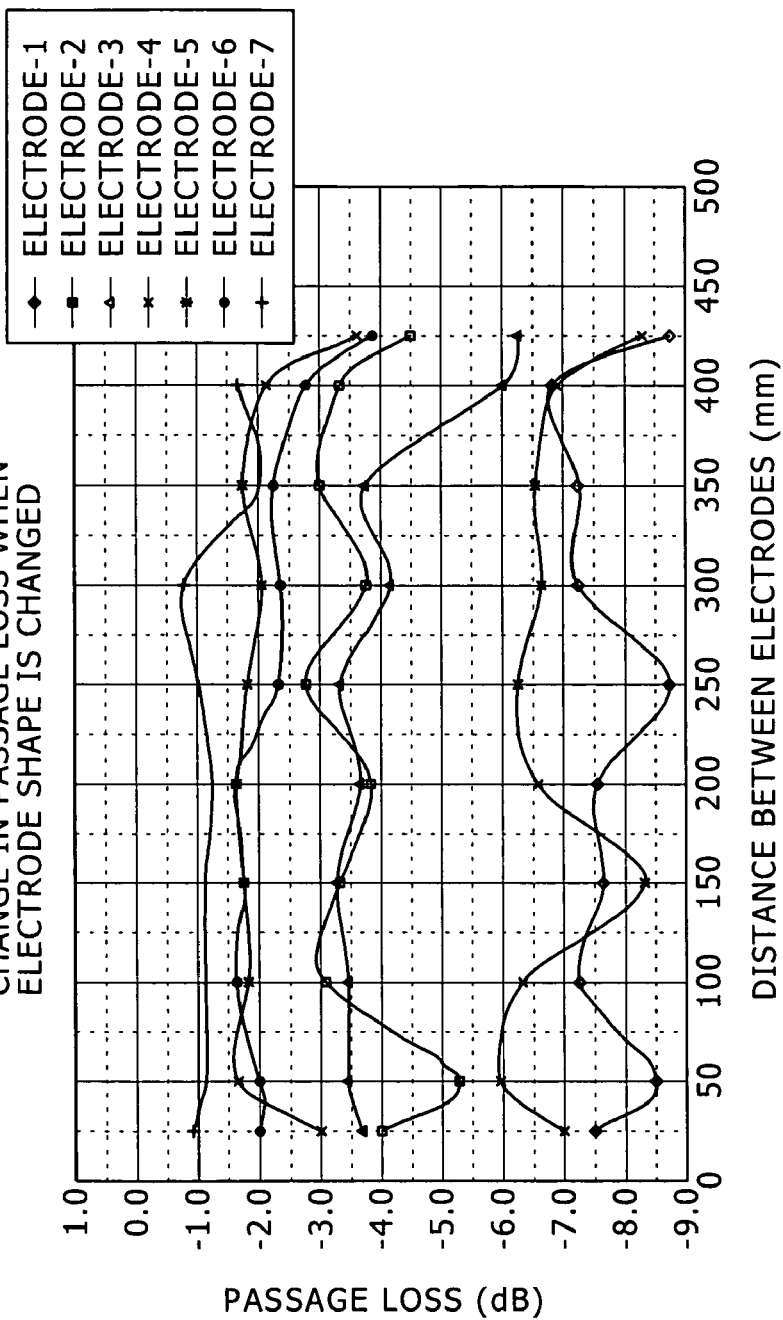

HUMAN BODY COMMUNICATION SYSTEM AND COMMUNICATION DEVICE

CROSS REFERENCES TO RELATED APPLICATIONS

The present invention contains subject matter related to Japanese Patent Application JP 2005-120317 filed in the Japanese Patent Office on Apr. 18, 2005, the entire contents of which being incorporated herein by reference.

BACKGROUND OF THE INVENTION

The present invention relates to a human body communication system and a communication device that communicate data using a human body as a transmission path, and particularly to a human body communication system and a communication device that communicate data via an electric field formed by the intervention of a human body.

More particularly, the present invention relates to a human body communication system and a communication device that transmit a relatively large amount of data such as audio via a human body, and particularly to a human body communication system and a communication device that transmit data via a human body with secrecy, with low power consumption, and without interfering with another communication system in a neighborhood.

In related art, listening to music with headphones connected to a portable type music reproducing device typified by a "WALKMAN (Registered Trademark of Sony Corporation)" is widely performed. The reproducing device proper can be put in a bag or a pocket, or worn on a body by a belt. However, when headphones are used, a headphone cable often becomes a hindrance and restricts the movement of a user when the cable winds around the body of the user.

As one method of achieving cable-less communication between the portable type music reproducing device and the headphones, the use of infrared communications such as IrDA and the like is considered. However, considering outdoor use, satisfactory communication quality may not be obtained due to effects of natural light. In addition, since infrared communications have a high directivity, positional relation between a transmitting device and a receiving device is limited considerably (for example a condition in which the transmitting device and the receiving device are within a line-of-sight range and there is no obstruction between the devices needs to be secured). Further, the light emission of an LED on the transmitter side increases power consumption. Infrared communications are thus considered to be unsuitable for practical use in battery-driven portable devices.

Bluetooth communication has spread as a radio communication technology using weak radio waves. Using the communication system for music data transmission between a portable type music reproducing device and headphones is considered, and the communication system is partly put to practical use. However, the Bluetooth communication uses a 2.4-GHz band as an ISM band (Industrial, Scientific and Medical frequency band) that does not require a license, interference of other radio waves of a microwave oven within a house, a wireless LAN and the like which radio waves use the same frequency band is inevitable. It is thus hard to say that the Bluetooth communication is a satisfactory transmission system from viewpoints of communication quality and secrecy.

Human body communication technology that incorporates a human body in a transmission path has recently started to draw attention. For example, a communication system (for personal authentication, payment, settlement of accounts or the like) is proposed in which a human body side communication device worn in contact with the skin of a human body is provided and an apparatus side communication device is provided in the vicinity of the human body, and by applying an alternating voltage to the human body via an electrode on the side of the human body communication device, simple information data is transmitted and received on the basis of the action of a capacitor with the human body interposed as a medium between the electrodes of the human body communication device and the apparatus side communication device, using a phenomenon of electrostatic induction occurring at the electrode of the apparatus side communication device (see for example "Human body communication already partly put to practical use, 10-Mbits/second prototype" (NIKKEI BYTE 2004 December)).

The present inventor et al. consider that it is possible to establish a connection between a portable music reproducing device and headphones by human body communication and thereby transmit audio data in a wireless manner. It is known for example that a communication between two devices that have an electrode, are independent of each other, and transmit weak radio waves having a level insufficient for mutual communication as they are is enabled by strengthening the radio waves with a human body as a medium (see for example, Japanese Patent Laid-open No. Hei 7-170215 and U.S. Pat. No. 5,914,701).

A human body has properties as a conductor and properties as a dielectric. A human body communication system using the former properties is referred to as a current type. In this case, the transmitting and receiving electrodes of a portable music reproducing device and headphones need to be in contact with a human body at all times. The human body communication system therefore has a problem in usability because the electrodes give an unpleasant feeling or a feeling of discomfort, for example.

A human body communication system using the properties of the human body as a dielectric is referred to as an electric field type. In this case, one of a radiation field propagating through space, a dielectric electromagnetic field, and a quasi-electrostatic field (not propagated) using the charging of a human body is formed between a transmitting electrode and a receiving electrode which electrodes are disposed such that the human body is interposed therebetween. A signal can be transmitted on the basis of a potential difference acting in such an electric field. While several human body communication systems of the electric field type are proposed, it has not been fully elucidated which of these electric fields is used.

For example, in a case where a portable type music reproducing device and headphones are connected to each other by a human body communication of the electric field type and an electric field formed by the interposition of a human body is a radiation field rather than a quasi-electrostatic field, even when excellent audio data transmission is achieved, the radiation field becomes a wave interfering with a neighboring radio system using a same frequency band, or another radio system interferes with the human body communication instead. In this case, the human body communication can be intercepted, and is therefore unable to maintain secrecy. Further, since an extra electric field (stronger than necessary) is radiated to the outside of the human body, power consumption is increased, which represents a critical problem especially for battery-driven portable devices.

The human body communication system in related art is predicated on the action of a capacitor with a human body interposed as a medium between the transmitting electrode and the receiving electrode. In such a case, a desired information communication speed cannot be obtained unless an electrode area is made considerably large, and it is therefore difficult to reduce the size of the device side communication device. When the electrode area is made considerably large, susceptibility to noise is increased instead, and therefore communication quality is lowered.

SUMMARY OF THE INVENTION

It is desirable to provide an excellent human body communication system and an excellent communication device that can communicate data via an electric field formed by the intervention of a human body.

It is also desirable to provide an excellent human body communication system and an excellent communication device that can suitably transmit a relatively large amount of data such as audio via a human body.

It is also desirable to provide an excellent human body communication system and an excellent communication device that can transmit data via a human body with secrecy, with low power consumption, and without interfering with another communication system in a neighborhood.

According to an embodiment of the present invention, there is provided a human body communication system for communicating data via an electric field formed by intervention of a human body, the human body communication system including: a transmitter for generating the electric field by transmitting a potential difference signal corresponding to transmission data from a transmitting electrode; and a receiver for receiving the data by reading the potential difference signal in the electric field by a receiving electrode; wherein the transmitter and the receiver use the potential difference signal in a frequency band such that a quasi-electrostatic field formed within the human body is dominant over a radiation field formed outside the human body when the transmitting electrode and the receiving electrode are each disposed in very close vicinity to the human body.

The system in this case refers to a logical set of a plurality of devices (or functional modules for realizing specific functions), and whether each device or functional module is present within a single casing is not of particular concern (the same is hereinafter true).

The human body communication system can transmit audio data in a wireless manner between a portable music reproducing device and headphones, for example, and is expected to be a communication system that can be comfortably worn by a human body as a wearable device.

In the human body communication system of the electric field type using the properties of a human body as a dielectric, it has not been fully elucidated which of a radiation field propagating through space, a dielectric electromagnetic field, and a quasi-electrostatic field using the charging of the human body actually contributes to data communication.

When the electric field formed by the intervention of the human body is a radiation field formed outside the human body rather than a quasi-electrostatic field passing within the human body, problems are presented in terms of interference with a neighboring communication system, secrecy of data communication, and power consumption of a portable type communication device.

Accordingly, in the human body communication system according to the above embodiment of the present invention, the transmitter and the receiver use the potential difference signal in a frequency band such that a quasi-electrostatic field formed within the human body is dominant over a radiation field formed outside the human body when the transmitting electrode and the receiving electrode are each disposed in very close vicinity to the human body. As a result of human body communication being performed by the quasi-electrostatic field, interference with a neighboring communication system is eliminated, and secrecy of the data communication is secured. In addition, information data transmission can be performed on weak power between the transmitter and the receiver, and the transmitter side does not need to consume unnecessary power so as to form an extra electric field.

The frequency band such that the quasi-electrostatic field formed within the human body is dominant is specifically a frequency band of 3 MHz and lower. However, when too low a carrier frequency is used, a bandwidth occupied for data transfer is narrowed, and only a low data rate is obtained. Thus, practical carrier frequency is about 500 kHz or higher, which allows transmission at 48 kbps defined by ATRAC3-plus, for example, without any problem.

Although these communication electrodes in the human body communication system of the electric field type do not need to be in contact with a human body, the communication electrodes have a high chance of being in contact with the human body because the communication electrodes are disposed in very close proximity to a skin surface. Accordingly, in the present invention, outermost surfaces of the input and output signal electrodes of the transmitter and the receiver are formed by a conductive nonwoven fabric or conductive cloth. By forming the electrodes having a possibility of being in contact with a human body by a conductive cloth, a wearable device that is comfortable when worn on the body can be realized. It is also possible to greatly reduce discomfort when a person having an allergy to metals uses the device.

While it is important for the transmitter and the receiver to have a same reference potential, it is not easy for mobile type devices such as a portable type music reproducing device, headphones and the like to obtain a ground plane. Accordingly, in the present invention, a more stable reference potential is obtained by drawing out a ground of a wiring board to the communication electrodes.

The input and output electrodes of the communication device in this case are formed by a signal electrode for transmitting or receiving a potential difference signal and a ground electrode drawn out from the wiring board. As electrode structure, there are two arrangements conceivable: a parallel arrangement in which the signal electrode and the ground electrode are both arranged on the surface of a human body, and a vertical arrangement in which the signal electrode is arranged on the surface of a human body and the ground electrode is opposed to the signal electrode. The present inventor et al. have demonstrated that the latter reduces transmission loss more.

Further, while the transmission loss is reduced as the area of the electrode of the transmitter is increased, increasing the area of the electrode on the receiver side does not lead to an improvement in the transmission loss. Hence, it suffices to form the transmitter and the receiver for transmission of an information signal via a human body such that the area of the output electrode on the transmitter side is larger than the area of the input electrode on the receiver side.

According to the present invention, it is possible to provide an excellent human body communication system and an excellent communication device that can suitably transmit a relatively large amount of data such as audio via a human body.

In addition, according to the present invention, it is possible to provide an excellent human body communication system and an excellent communication device that can transmit data via a human body with secrecy, with low power consumption, and without interfering with another communication system in a neighborhood.

Further, according to the present invention, it is possible to provide a wearable type information transmission system that can perform short-distance information data transmission in which operation on weak power can be performed by the intervention of a human body.

The human body communication system according to the above embodiment of the present invention enables the transmission of an information signal via a human body with high communication quality, and can provide a wireless portable type audio reproducing device that can be comfortably worn on the body as a wearable device. Further, it is possible to improve secrecy and reduce power consumption in short-distance information data transmission.

Other and further objects, features, and advantages of the present invention will become apparent from more detailed description on the basis of accompanying drawings and embodiments of the present invention to be described later.

BRIEF DESCRIPTION OF THE DRAWINGS

FIG. 10 is a diagram showing results of measurement of transmission loss when the area of the electrodes of the transmitter and the receiver was changed in the human body communication system using a quasi-electrostatic field.

DETAILED DESCRIPTION OF THE PREFERRED EMBODIMENTS

A preferred embodiment of the present invention will hereinafter be explained in detail with reference to the drawings.

The present invention relates to a human body communication system in which data communication is performed by using a human body as a transmission path, and particularly to a human body communication system in which data communication is performed through an electric field formed by the interposition of a human body. The human body communication system can transmit audio data in a wireless manner between a portable music reproducing device and headphones, for example, and is expected to be a communication system that can be comfortably worn by a human body as a wearable device (see FIG. 1).

A human body has properties as a conductor and properties as a dielectric. Human body communication systems of a current type using the former properties and of an electric field type using the latter properties are considered. The former type requires the transmitting and receiving electrodes of a portable music reproducing device and headphones to be in contact with a human body at all times, and has a problem in usability because the electrodes give an unpleasant feeling or a feeling of discomfort, for example. Accordingly, the electric field type is used as a human body communication system according to an embodiment of the present invention.

Figure 2:
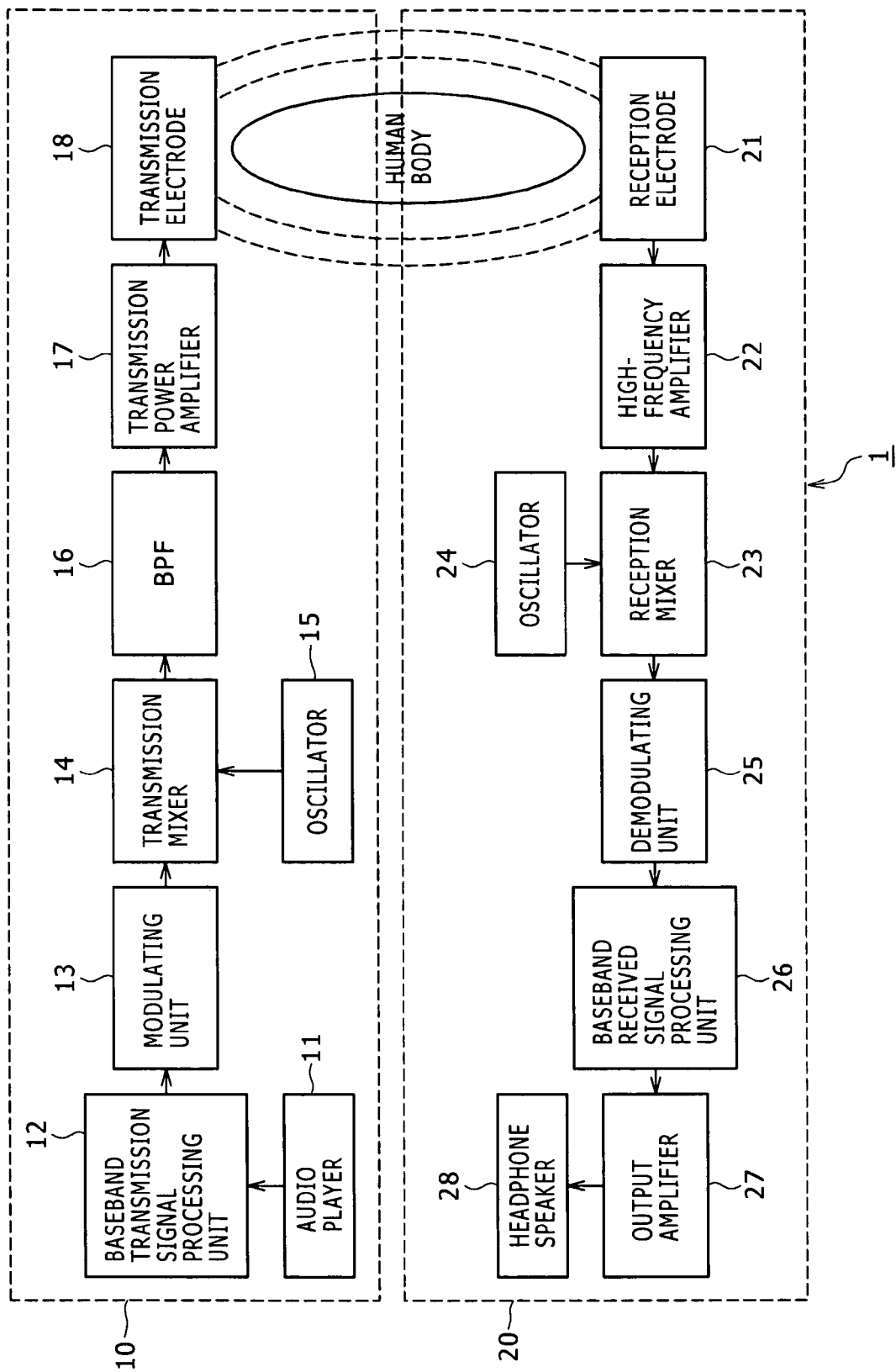
FIG. 2 is a diagram schematically showing a configuration of a human body communication system according to an embodiment of the present invention.

FIG. 2 schematically shows a configuration of a human body communication system according to an embodiment of the present invention. As shown in FIG. 2, in the human body communication system 1, a transmitter 10 formed as a portable type music reproducing device and a receiver 20 formed as a headphone speaker are opposed to each other with a human body interposed between the transmitter 10 and the receiver 20.

A baseband transmission signal processing unit 12 on the transmitter 10 side subjects an audio input from an information source such as an audio player 11 or the like to A/D conversion. Incidentally, while the audio input may be transmitted on a carrier as it is in a subsequent stage, the audio input may be subjected to an encoding (mapping) process such as BPSK, QPSK or the like in the digital processing unit. Then, a modulating unit 13 modulates the audio signal. A transmission mixer 14 upconverts the audio signal by subjecting a local frequency from an oscillator 15 and the audio signal to frequency synthesis. In this case, a frequency band such that a quasi-electrostatic field formed within the human body is dominant over a radiation field formed outside the human body is used as a transmission frequency band. After the frequency synthesis, a band-pass filter (BPF) 16 passes only a predetermined frequency band of the transmission signal. Further, a transmission power amplifier (PA) 17 subjects the transmission signal to power amplification. The transmission signal is data-transmitted as a potential difference signal from a transmission electrode 18 installed in the vicinity of the human body.

A reception electrode 21 installed in the vicinity of the human body on the receiver 20 side reads change in potential. This potential change is subjected to power amplification by a high-frequency amplifier (LNA) 22. Further, a reception mixer 23 downconverts the received signal by subjecting a local frequency from an oscillator 24 and the received signal to frequency synthesis. The audio modulated signal after being downconverted is demodulated by a demodulating unit 25, and then decoded into a digital audio signal by a baseband received signal processing unit 26. Further, the audio signal is amplified by an output amplifier 27, and is then output as audible sound from a headphone speaker 28.

The human body communication system of the electric field type using the properties of the human body as a dielectric has a problem in that it is unclear which of a radiation field propagating through space, a dielectric electromagnetic field, and a quasi-electrostatic field using the charging of the human body actually contributes to data communication. This will be discussed in the following.

Figure 3:
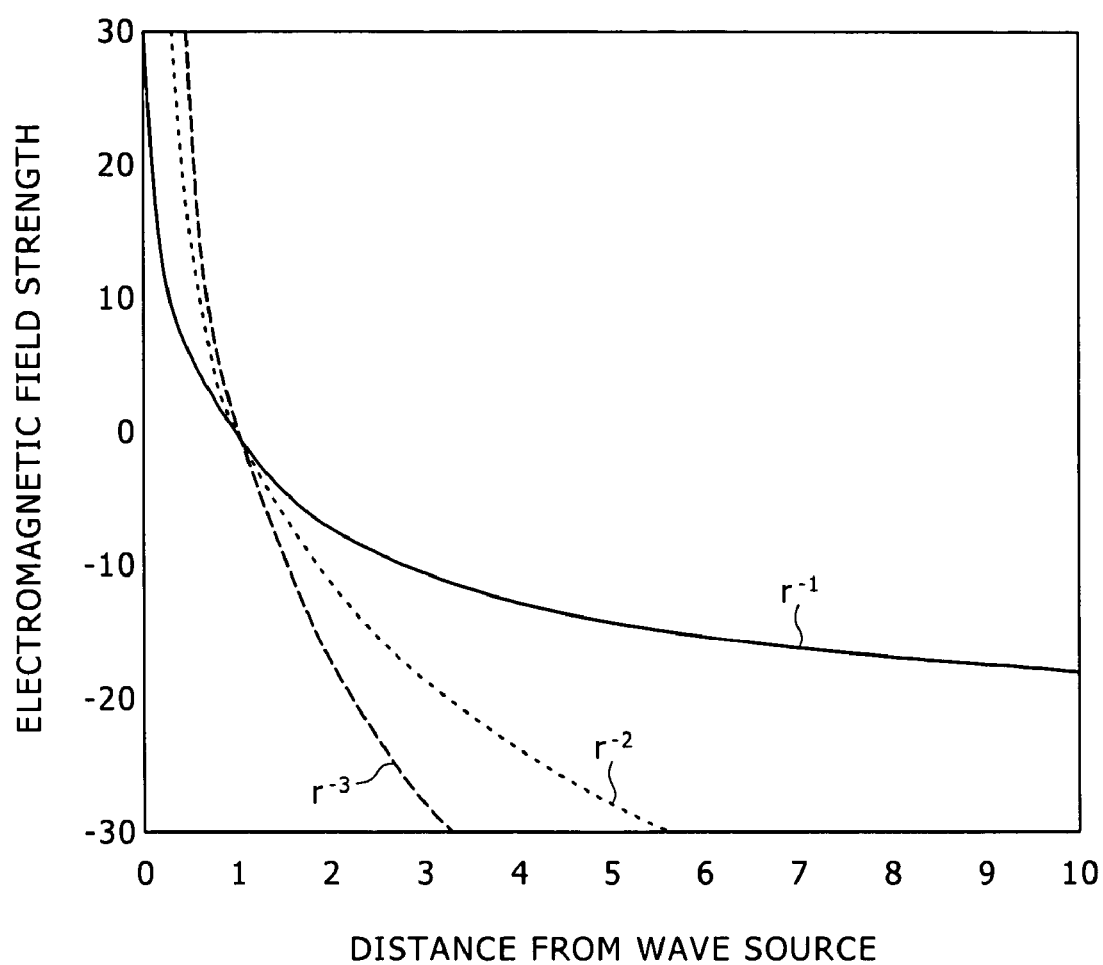
FIG. 3 is a diagram showing relation between distance from a wave source and electromagnetic field strength.
Figure 4:
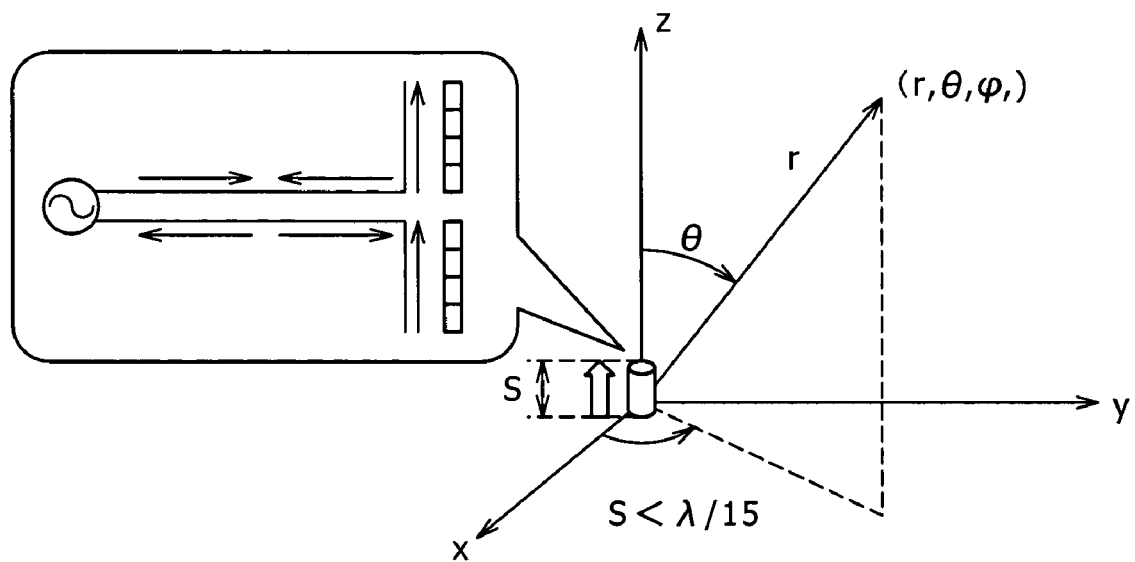
FIG. 4 is a diagram showing relation between a minute current element and a coordinate system.

Generally, when a current is passed through an electric dipole (minute dipole antenna), an electric field E and a magnetic field H at a point at a distance r from the antenna are represented as shown in FIG. 3. As expressed by the following equation, the intensity of an electromagnetic field radiated from a minute current element is a vector sum of three components that are inversely proportional to the distance r, the square of the distance r, and the cube of the distance r. Of the components, the components of the magnetic field H do not include a term of $1/r^3$. Relation between the minute current element and a coordinate system is set as shown in FIG. 4.

$$E_r = z \frac{Ise^{-jkr}}{2\pi} k^2 \left( \frac{1}{(kr)^2} - j\frac{1}{(kr)^3} \right) \cos\theta \quad \text{[Equation 1]}$$

$$\begin{cases} E_\theta = \frac{Ise^{-jkr}}{4\pi} k^2 \left( j\frac{1}{kr} + \frac{1}{(kr)^2} - j\frac{1}{(kr)^3} \right) \sin\theta \\ H_\kappa = \frac{Ise^{-jkr}}{4\pi} k^2 \left( j\frac{1}{kr} + \frac{1}{(kr)^2} \right) \sin\theta \end{cases} \quad Z = \sqrt{\frac{\varepsilon}{\mu}}$$

$$E_\phi = H_r = H_\theta = 0$$

The components inversely proportional to the distance r, the square of the distance r, and the cube of the distance r are referred to as a radiation field, an induction field, and a quasi-electrostatic field, respectively. The radiation field inversely proportional to the distance r is attenuated in proportion to $r^{-1}$ (free-space loss), but becomes dominant as the distance r is increased ($r > \lambda/2\pi$). This component is present in only $E_\theta$ and $H_\phi$, and is a plane wave orthogonal to an r component (that is, a traveling direction) with the electric field E and the magnetic field H orthogonal to each other.

As is understood from FIG. 3, the intensities of the radiation field (term of $1/r$), the induction field (term of $1/r^2$), and the quasi-electrostatic field (term of $1/r^3$) are equal to each other at a distance $\lambda/2\pi$, and are sharply increased as the distance r becomes less than the distance $\lambda/2\pi$. For example, the distance $\lambda/2\pi$ is about 4.8 m in the case of a frequency of 10 MHz, and the distance $\lambda/2\pi$ is about 15.9 m in the case of a frequency of 3 MHz. The information transmission system according to the present embodiment is a transmission system using mainly a quasi-electrostatic field in the vicinity of a human body. Incidentally, ordinary radio transmission is for use at a sufficient distance from an antenna, and therefore uses the radiation field (term of $1/r$).

A human body communication system in related art is predicated on the action of a capacitor with a human body interposed as a medium between a transmitting electrode and a receiving electrode. In such a case, a desired information communication speed cannot be obtained unless an electrode area is made considerably large, and it is therefore difficult to reduce the size of a device side communication device. When the electrode area is made considerably large, susceptibility to noise is increased instead, and therefore communication quality is lowered.

On the other hand, in order to realize for example high-quality wireless headphones to which a wearable type music reproducing device transmits an audio signal via a human body, the present invention selects an appropriate transmission frequency band and devises the configuration of each of a transmitting electrode part and a receiving electrode part.

Selection of Transmission Frequency Band

Figure 5:
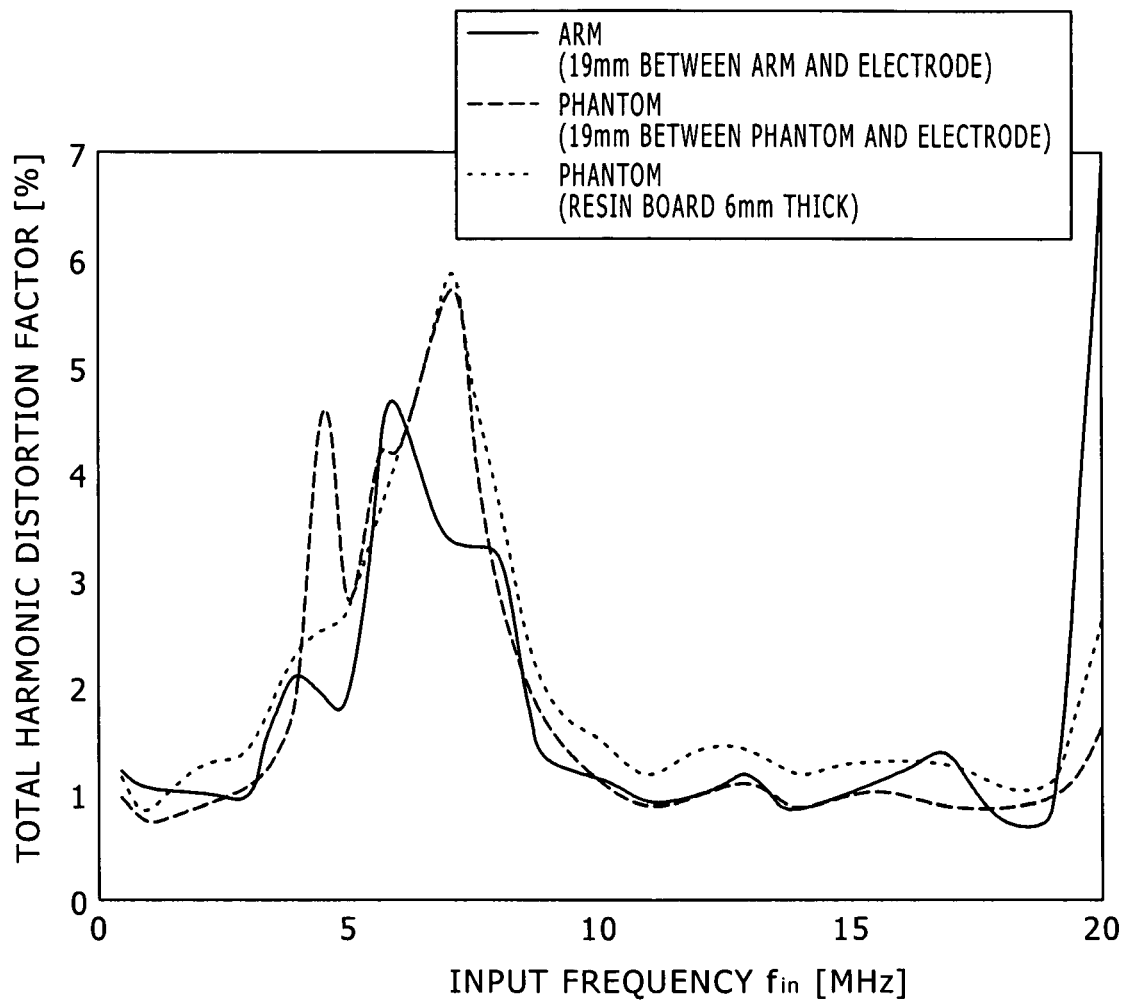
FIG. 5 is a diagram showing an example of actually measured values of total harmonic distortion at a receiver when an FM-modulated audio signal was transmitted via a human body while carrier frequency was varied.

FIG. 5 shows an example of actually measured values of total harmonic distortion at a receiver when an FM-modulated audio signal was transmitted via a human body while carrier frequency was varied. Suppose that an electrode area is 30×30 mm and that a transmission distance is 30 mm.

FIG. 5 indicates that total harmonic distortion is increased and thus the transmission quality of the audio signal is degraded when the carrier frequency is 3 to 9 MHz and 20 MHz or higher. In other words, total harmonic distortion is small and thus good communication quality is obtained in frequency bands of 500 kHz to 3 MHz and 10 MHz to 19 MHz.

A so-called shortwave band of 3 to 30 MHz is often used in shortwave broadcasting, amateur radio, commercial radio, and the like. An ultrashort wave band (30 to 300 MHz) higher than the shortwave band is used in FM radio broadcasting, VHF television, and a part of mobile communications. Adverse effects of radio wave interference by these communications are considered to be a factor in the distortion. A medium-wave band (300 kHz to 3 MHz) lower than these bands is used in AM radio broadcasting. It is indicated, however, that no particular effects are produced in the medium-wave band.

Incidentally, as a result of similar experiment using an artificial human body model (phantom) made of a composite dielectric material so as to have substantially similar electrical characteristics to those of the human body, evaluation results substantially coinciding with those when an experiment was actually performed on a human body were obtained.

Figure 6:
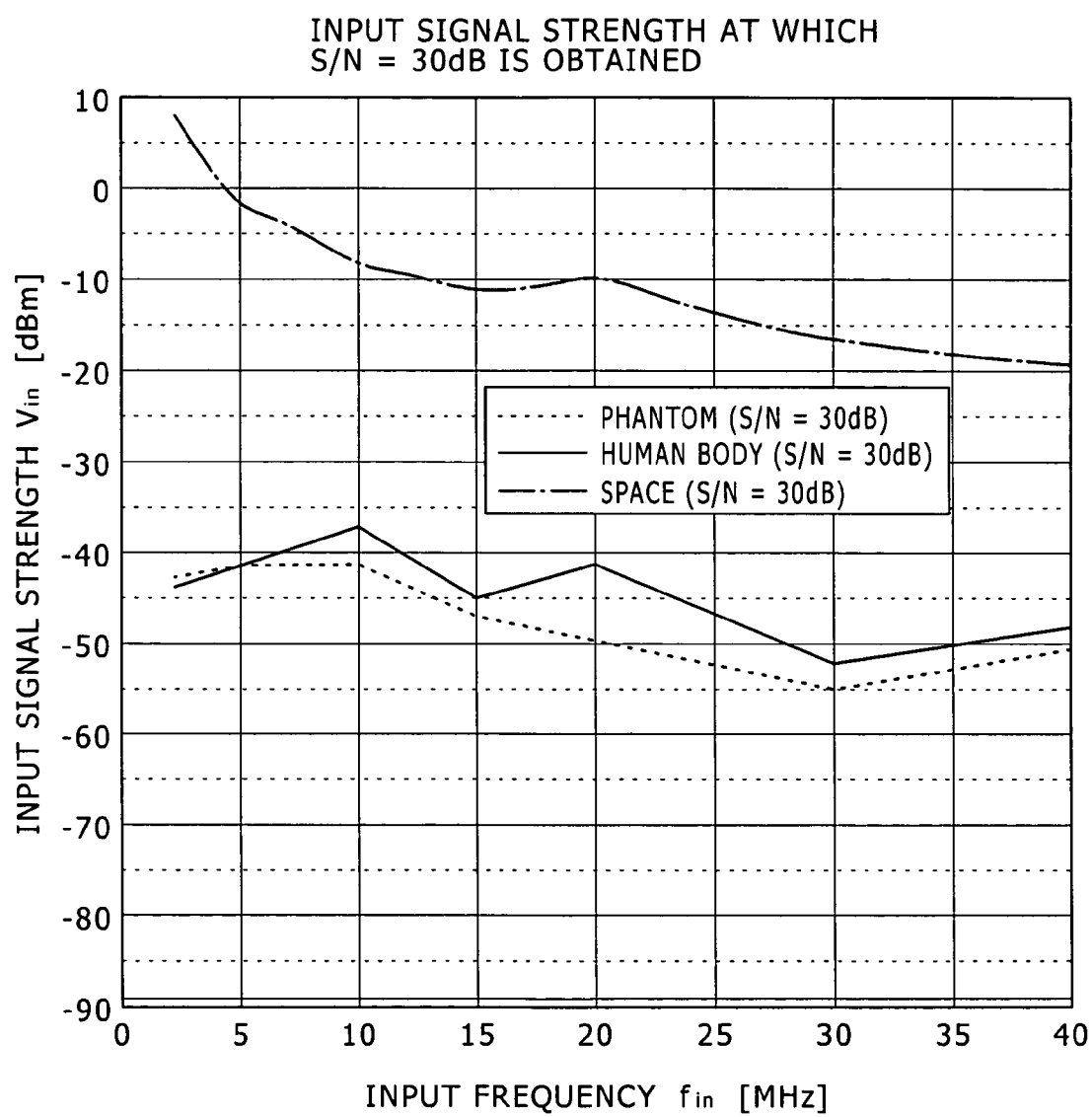
FIG. 6 is a diagram showing results of actual measurement of output signal strengths on a transmitting side at which strengths S/N=30 dB were ensured when an FM-modulated audio signal was transmitted between a transmitter and a receiver via different media while carrier frequency was varied.

FIG. 6 shows results of actual measurement of output signal strengths on a transmitting side at which strengths S/N=30 dB were ensured when an FM-modulated audio signal was transmitted between a transmitter and a receiver via different media while carrier frequency was varied. FIG. 6 indicates that the audio signal can be transmitted via a human body by signal output of lower strength than at a time of space transmission while sound quality is maintained.

Figure 7:
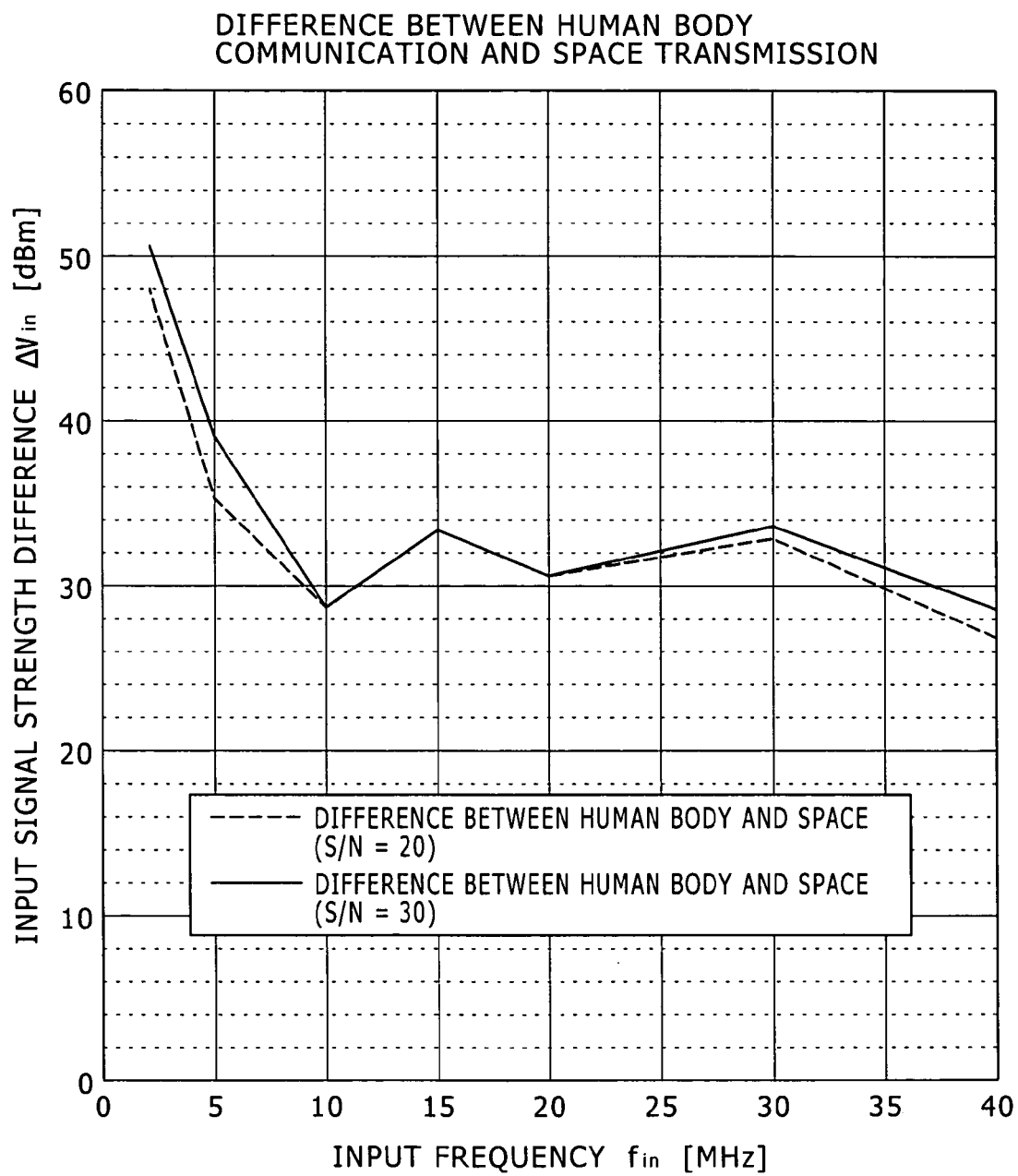
FIG. 7 is a diagram showing plotted differences in output signal strength necessary to transmit the audio signal between human body communication and space transmission.

FIG. 7 shows differences in output signal strength necessary to transmit the audio signal between human body communication and space transmission, the differences in output signal strength being plotted from the results of FIG. 6. FIG. 7 shows the differences in output signal strength in both cases of an S/N ratio=30 and an S/N ratio=20.

Results shown in FIG. 7 indicate that the differences between human body communication and space transmission are large when low carrier frequency lower than 10 MHz is used. This means that human body communication proper by a quasi-electrostatic field is dominant over space transmission by a radiation field in a transmission frequency band lower than 10 MHz. That is, it can be said that use of lower carrier frequencies is effective in suppressing space transmission by a radiation field and making human body communication by a quasi-electrostatic field a dominant propagation mode with an intention of eliminating effects of interference of other radio waves and securing secrecy of communication.

However, when too low a carrier frequency is used, a bandwidth occupied for data transfer is narrowed, and only a low data rate is obtained.

In data transmission, it can be considered that a data rate corresponding to about one tenth of a used frequency band can be secured. Data rates in audio data formats currently in wide use are as follows.

Linear PCM (CD) . . . 1411 kbps
MP3 (MPEG-1 Audio Layer-3) . . . 96/112/128/160/192/ 224/256/320 kbps
WMA . . . 48 to 192 kbps
ATRAC3 . . . 66/105/132 kbps
ATRAC3plus . . . 48/64/256 kbps Thus, it can be said that the carrier frequency is desirably about 500 kHz or higher in order to secure a sufficient band for passing a 48-kbps audio signal of ATRAC3plus.

As regards selection of a transmission frequency band in the human body communication system for transmitting audio signals, the following conclusion can be drawn.

"A transmitter and a receiver for transmitting an audio signal via a human body are provided with an audio signal modulating (demodulating) section for modulating (demodulating) the audio signal in a frequency band at least from 500 kHz to 3 MHz."

The transmitter side selects a transmission frequency of high transmission quality for audio reproduced signal data, and generates a modulated quasi-electrostatic field, whereby the human body having a property of being charged excellently can act as an antenna that propagates the quasi-electrostatic field isotropically from the surface of the human body to the periphery thereof. On the other hand, the receiver side demodulates information data in a reception frequency band of high transmission quality on the basis of change in the charged state of the human body to which an alternating voltage is applied. Then, as a result, it is possible to perform a communication in which an induction field and a radiation field unnecessary for quasi-electrostatic field communication are suppressed.

Such a human body communication system enables a reduction in energy required for the communication, and suppression of unnecessary propagations and improvement in spatial resolution. It is thus possible to stabilize information communication (audio signal transmission) via a human body, improve secrecy, and lower power consumption.

A human body is charged by movement of a very little charge (said to be on the order of microamperes). A change in the charged state of the human body instantly propagates on the surface of the human body, so that an equipotential surface of a quasi-electrostatic field is isotropically formed on the periphery of the human body. The human body communication system according to the present embodiment selects a carrier frequency in a very close field in which a quasi-electrostatic field is dominant, and thereby further suppresses effects of a radiation field and an induction field and makes a human body function more effectively as an antenna for the quasi-electrostatic field.

Configuration of Communication Electrodes

Consideration will first be given to materials used in the transmission electrode 18 of the transmitter 10 and the reception electrode 21 of the receiver 20.

Although these communication electrodes in the human body communication system of the electric field type do not need to be in contact with a human body, the communication electrodes have a high chance of being in contact with the human body because the communication electrodes are disposed in very close proximity to a skin surface.

In the present embodiment, outermost surfaces of the input and output signal electrodes 18 and 21 of the transmitter and the receiver are formed by a conductive nonwoven fabric (for example PET/Cu plated with Ni) or a conductive cloth (for example acrylic/Cu plated with Ni). As the conductive cloth, a normal fabric or a nonwoven fabric may be used.

A conductive fiber used in this case is formed by performing electroless plating of the surface of a synthetic fiber with at least one of Ag, Cu, Ni, and Sn. As the synthetic fiber, fibers of nylon, polyester, acrylic, polyvinyl alcohol and the like can be used. As material in electroless plating, the four above-mentioned metals (Ag, Cu, Ni, and Sn) are preferably used from viewpoints of conductivity, resistance to corrosion, antimicrobial properties and the like. When importance is attached to conductivity, Ag is desirable.

A nonwoven fabric having conductivity is obtained by coating the surface of a nonwoven fabric formed by entangling short fibers with each other by a water current, an air current or the like and connecting the short fibers by heat, a binder or the like with the four above-mentioned metals having conductivity by a method such as thin-film deposition or the like.

The electrodes having a possibility of being in contact with a human body are thus formed by a conductive cloth, whereby a wearable device that is comfortable when worn on the body can be realized. It is also possible to greatly reduce discomfort when a person having an allergy to metals uses the device.

Consideration will next be given to mechanical structures of the transmission electrode 18 of the transmitter 10 and the reception electrode 21 of the receiver 20. Careful consideration needs to be given to the arrangement of the electrodes of the transmitter and the receiver in order to transmit an information signal efficiently on the basis of change in the charged state of the human body.

In a communication system, it is generally important for a transmitter and a receiver to have a same reference potential in order to secure communication quality. An ordinary stationary type communication device could obtain a stable reference potential from a ground plane. On the other hand, a mobile type device cannot obtain a ground plane in return for portability, and thus substitutes a ground plane provided on a wiring board or the like. In this case, sufficient transmission characteristics for a human body communication system operating on weak power may not be obtained.

Figure 8:
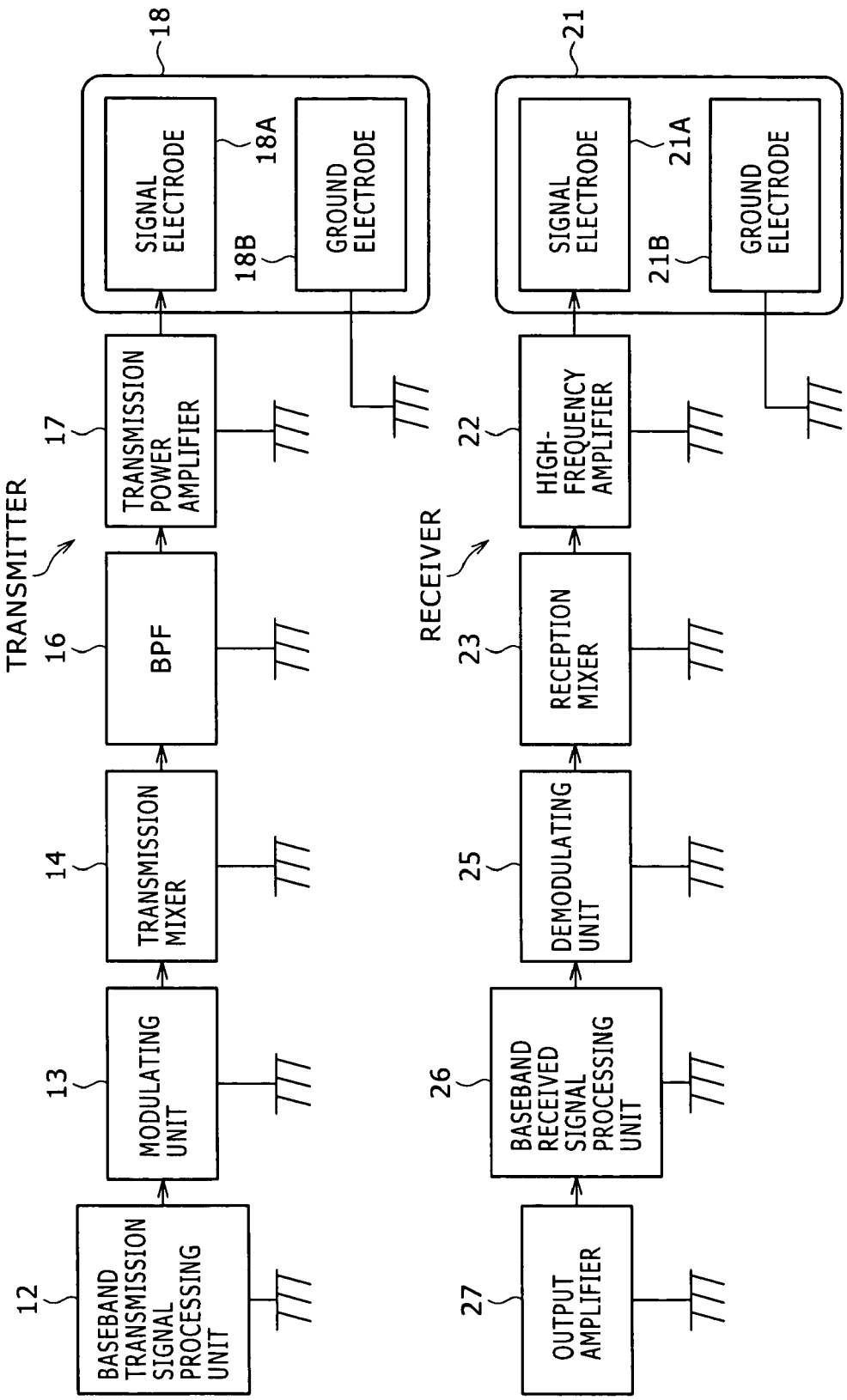
FIG. 8 is a diagram showing an example of a circuit in which communication electrodes of a human body communication device are formed by a pair of a signal electrode and a ground electrode.

Accordingly, in the present embodiment, the ground of the wiring board is drawn out to the communication electrodes. Specifically, the communication electrodes such as the transmission electrode 18 and the reception electrode 21 are formed by a pair of a signal electrode 18A/21A for transmitting or receiving a potential difference signal from a quasi-electrostatic field formed on a human body and a ground electrode 18B/21B drawn out from a wiring board. Both the electrodes are disposed so as to be opposed to each other, and are thus used as substantially parallel plate electrodes (see FIG. 8). Each circuit component obtains a reference potential from a ground of the wiring board. This ground is drawn out from the board together with a communication signal line to form the ground electrode. The reference potential obtained by the ground is thereby stabilized.

Figure 9:
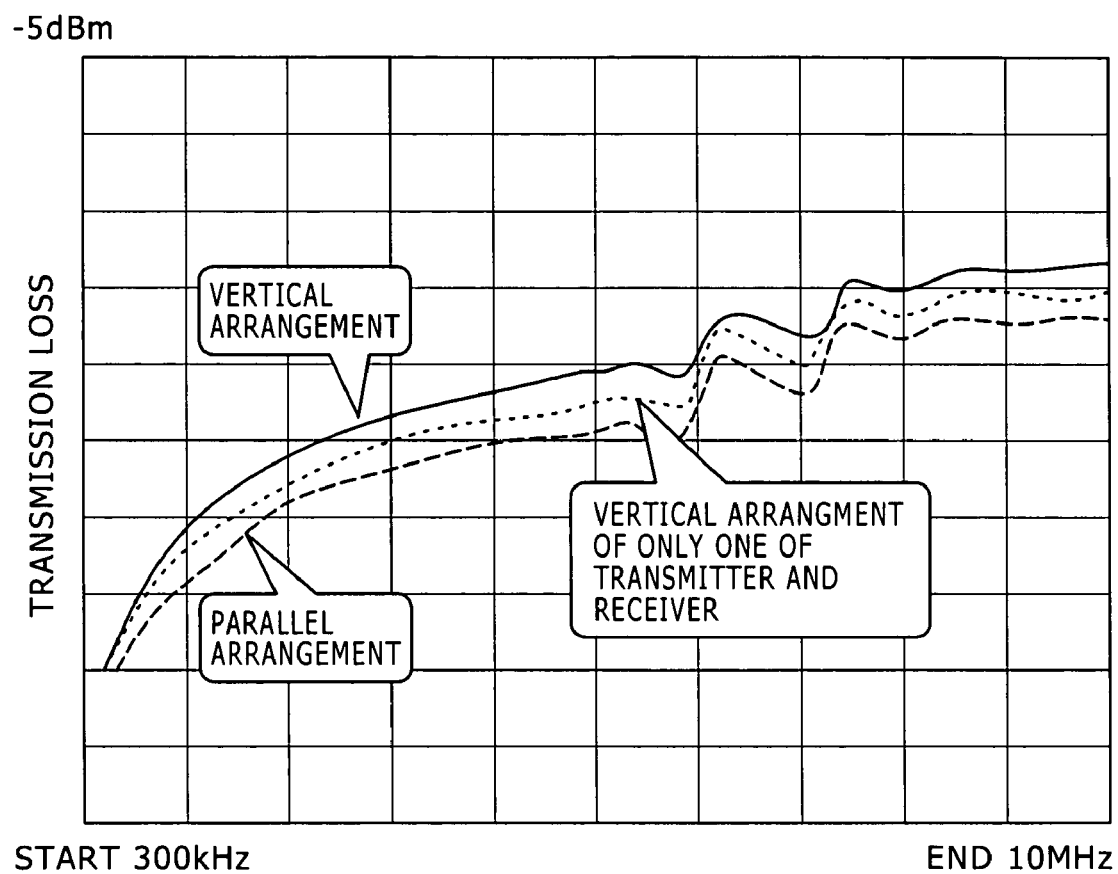
FIG. 9 is a diagram showing results of measurement of transmission loss in cases of a parallel arrangement and a vertical arrangement of the signal electrodes and the ground electrodes with respect to a human body.

As electrode structure in this case, there are two arrangements conceivable: a parallel arrangement in which the signal electrode and the ground electrode are both arranged on the surface of a human body, and a vertical arrangement in which the signal electrode is arranged on the surface of a human body and the ground electrode is opposed to the signal electrode. FIG. 9 shows results of measurement of a transmission loss in each case. FIG. 9 indicates that the latter vertical arrangement provides an improvement of about 9 dB in transmission loss over the parallel arrangement. A certain degree of reduction in transmission loss is also achieved by using parallel plate electrodes (vertical arrangement) as the electrode configuration of one of the transmitter and the receiver.

Incidentally, it was felt when an audio signal was actually transmitted by a prototype that noise is superimposed and communication quality is obviously degraded unless parallel plate electrodes are formed on the transmitter (audio signal player) side.

Consideration will finally be given to size of the communication electrodes of the transmitter and the receiver.

Figure 1:
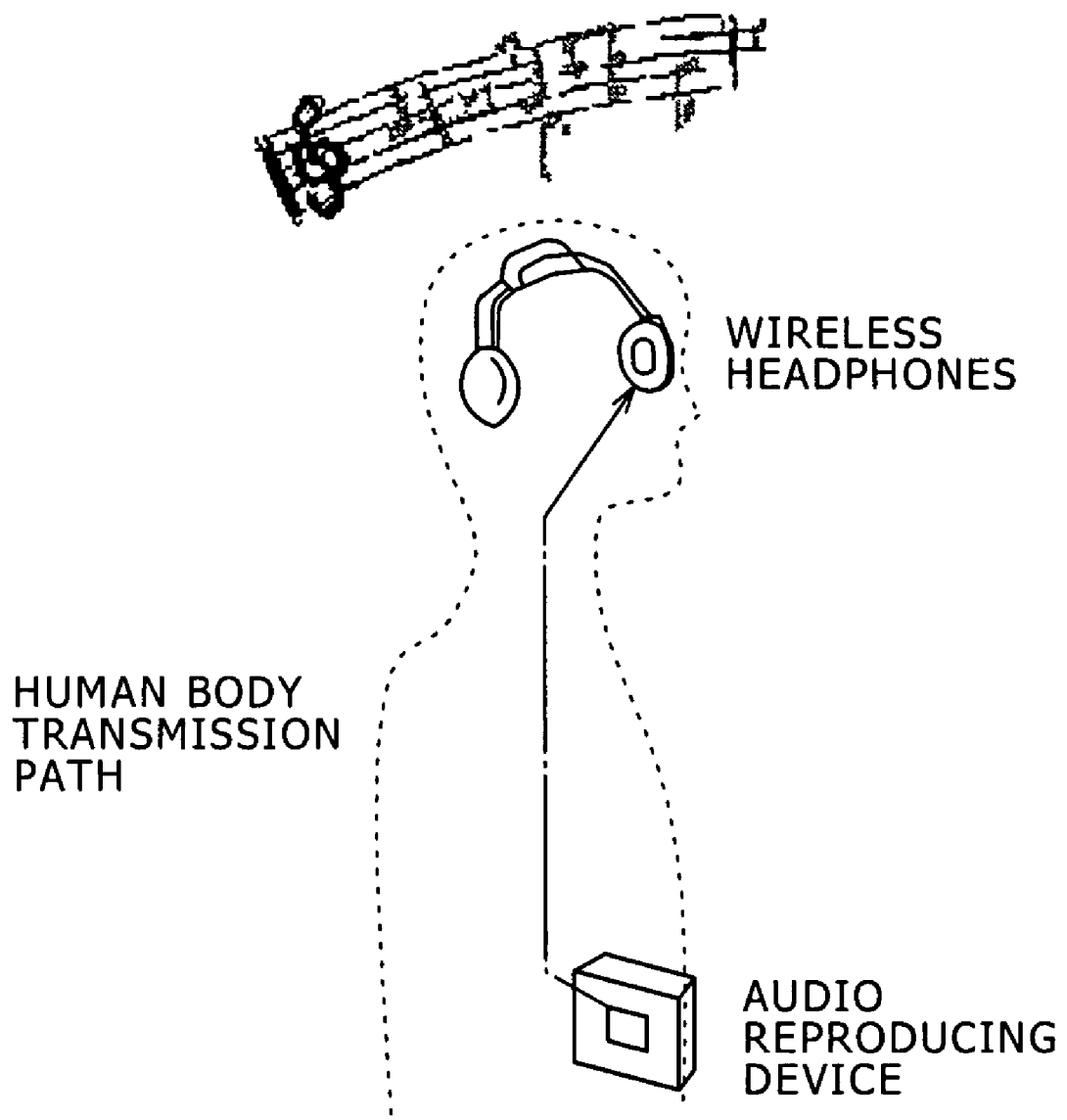
FIG. 1 is a diagram showing a configuration of a wearable type information transmitting device using human body communication.

An electric capacity (capacitance) of a capacitive coupling is proportional to the area of electrodes, and is inversely proportional to a distance between the electrodes. Transmission characteristics are therefore expected to be improved by increasing the area of the electrodes in the human body communication system as shown in FIG. 1 of "Human body communication already partly put to practical use, 10-Mbits/second prototype" (NIKKEI BYTE 2004 December) (described earlier). However, this method conflicts with reduction of device size.

FIG. 10 shows results of measurement of transmission loss when the area of the electrodes of the transmitter and the receiver was changed in the human body communication system according to the present embodiment using a quasi-electrostatic field. In this case, a band of 500 kHz to 3 MHz derived from the results shown in FIG. 5 and FIG. 7 are used as transmission frequencies.

FIG. 10 indicates that the transmission loss is reduced as the area of the electrode of the transmitter is increased, whereas increasing the area of the electrode on the receiver side does not lead to an improvement in transmission loss. Hence, it suffices to form the transmitter and the receiver for transmission of an information signal via a human body such that the area of the output electrode on the transmitter side is larger than the area of the input electrode on the receiver side (preferably larger than 2 $mm^2$).

The present invention has been explained above in detail with reference to a specific embodiment thereof. It is obvious, however, that modifications and substitutions in the embodiment may be made by those skilled in the art without departing from the spirit of the present invention.

While description in the present specification has been made centering on an embodiment applied to a wearable type information transmission in which audio data is transmitted in a wireless manner between a portable music reproducing device and headphones, the spirit of the present invention is not limited to this. The present invention is similarly applicable to an information transmission system in another form that operates on weak power with an intervention of a human body and human body communications transmitting data other than audio data.

That is, the present invention has been disclosed in a form that is illustrative and contents described in the present specification are not to be construed in a restrictive manner. In order to determine the spirit of the present invention, claims are to be considered.

It should be understood by those skilled in the art that various modifications, combinations, sub-combinations and alterations may occur depending on design requirements and other factors insofar as they are within the scope of the appended claims or the equivalents thereof.

What is claimed is:

1. A human body communication system for communicating data via an electric field formed by intervention of a human body, said human body communication system comprising:
    a transmitter for generating said electric field by transmitting a potential difference signal corresponding to transmission data from a transmitting electrode; and
    a receiver for receiving the data by reading the potential difference signal in said electric field by a receiving electrode;
    wherein said transmitter and said receiver use the potential difference signal in a frequency band such that a quasi-electrostatic field formed within the human body is dominant over a radiation field formed outside the human body when said transmitting electrode and said receiving electrode are each disposed in very close vicinity to the human body.

2. The human body communication system as claimed in claim 1,
    wherein said transmitter and said receiver use a frequency band of 3 MHz and lower.

3. The human body communication system as claimed in claim 2,
    wherein said transmitter and said receiver use a frequency band that enables a desired data rate to be obtained.

4. The human body communication system as claimed in claim 3,
    wherein said transmitter and said receiver use a frequency band of 500 kHz and higher.

5. The human body communication system as claimed in claim 1,
    wherein at least one of said transmitter and said receiver has a communication electrode formed with one of a conductive nonwoven fabric and a conductive cloth.

6. The human body communication system as claimed in claim 1,
    wherein the communication electrode of at least one of said transmitter and said receiver is formed by a signal electrode for transmitting or receiving the potential difference signal and a ground electrode drawn out from a ground of a wiring board.

7. The human body communication system as claimed in claim 6,
    wherein said signal electrode is disposed in proximity to a surface of the human body, and said ground electrode is disposed so as to be opposed to said signal electrode.

8. The human body communication system as claimed in claim 1,
    wherein an area of the output electrode of said transmitter is larger than an area of the input electrode of said receiver.

9. A communication device for transmitting data via an electric field formed by intervention of a human body, said communication device comprising:
    a transmission signal processing section for generating a transmission data signal using a predetermined transmission frequency band; and
    a transmitting electrode for generating the electric field by making a potential difference corresponding to the transmission data signal;
    wherein a frequency band such that a quasi-electrostatic field formed within the human body is dominant over a radiation field formed outside the human body when said transmitting electrode is disposed in very close vicinity to the human body is used as the transmission frequency band.

10. The communication device as claimed in claim 9,
    wherein a frequency band of 3 MHz and lower is used as said transmission frequency band.

11. The communication device as claimed in claim 10,
    wherein a frequency band that enables a desired data rate to be obtained is used as said transmission frequency band.

12. The communication device as claimed in claim 11,
    wherein a frequency band of 500 kHz and higher is used as said transmission frequency band.

13. The communication device as claimed in claim 9,
    wherein a surface of said transmitting electrode which surface is opposed to the human body is formed by one of a conductive nonwoven fabric and a conductive cloth.

14. The communication device as claimed in claim 9, wherein said transmitting electrode is formed by a signal electrode for transmitting a potential difference signal and a ground electrode drawn out from a ground of a wiring board.

15. The communication device as claimed in claim 14, wherein said signal electrode is disposed in proximity to a surface of the human body, and said ground electrode is disposed so as to be opposed to said signal electrode.

* * * * *